UNITED STATES PATENT OFFICE 2,131,154

COLORED PLASTIC MASS AND PROCESS OF MAKING THE SAME

Fritz Straub and Hans Mayer, Basel, Switzerland, assignors to the firm of Society of Chemical Industry in Basle, Basel, Switzerland No Drawing. Application February 3, 1936, Serial No. 62,232. In Switzerland February 6, 1935

2 Claims. (Cl. 106—37)

This invention relates to the manufacture of colored plastic masses by incorporating in the mass a complex metal compound derived from logwood-extract.

Complex metal compounds from logwood-extract are, for example, compounds of logwood-extract which contain in complex union chromium, copper, iron, cobalt, nickel, aluminium, manganese, zinc, vanadium, titanium, tungsten or molybdenum.

The manufacture of these complex metal compounds may consist in treating logwood-extract, which advantageously may be a solution of extract, with an agent yielding metal in the form, for example, of its hydrate or its salt with an inorganic or an organic acid, for example hydrochloric acid, sulfuric acid, formic acid, acetic acid, lactic acid, benzenesulfonic acid, naphthalene-sulfonic acid, stearic acid, palmitic acid, oleic acid, or in the form of a complex compound of the salt, for instance with ammonia or pyridine, and the treatment may occur in neutral, acid or alkaline medium. As the agents yielding metal there may also be used the complex metal compounds of logwood-extract which may contain one or several metals, the selected agent being caused to act on logwood-extract. The agent yielding metal may be used alone or in the presence of a usual additional material applied in the production of complex metal compounds of dyestuffs, for instance an hydroxy-carboxylic acid (tartaric acid), formic acid, an alcohol, pyridine, a salt of an inorganic or organic acid; moreover, only one agent yielding metal may be used or several such agents, either simultaneously or in succession, for the treatment of the extract. The complex metal compounds produced may contain for each group capable of being metallized in the dyestuff molecule less than one atom or one atom or more than one atom of metal.

The masses which are also used in solutions (for example in water, alcohols, glycols, ketones, for instance acetone; hydrocarbons, for instance benzene and toluene; ethers, ether-alcohols and esters, for instance glycol-alkylether and butyl-acetate, drying or hardening oils, mixtures of solvents, such as are usual for nitrocellulose lacquers) and which may be dyed with the complex metal compounds are, for example, those which are derived from a cellulose basis or a basis of natural or artificial resin. Those derived from a cellulose basis are, for example, lacquers and plastic masses from nitro-cellulose, acetyl-cellulose, ethyl-cellulose or benzyl-cellulose, and other esters and ethers of cellulose. The masses derived from natural resin may be lacquer resins, for instance copal, amber, shellac, colophony or waxes, such as carnauba wax or ozokerite, or natural polymerization products, such as rubber, balata or gutta-percha. To masses which are based upon artificial resins belong, for example, the condensation products from aldehydes with phenols or with aromatic amines, for instance aniline, or with acid amides, for instance urea, thiourea or their derivatives, as well as aryl-sulfamides; furthermore, the condensation products of polybasic acids with polyhydric alcohols, such as glyptals and alkyde-resins; also polymerization products, such as vinyl-resin, styrene-resin and acrylic acid-resin; finally casein.

The dyestuff may be incorporated in the mass in any desired manner, for example by mixing the mass with the dyestuff in a suitable manner, for instance by grinding, or by treating the solid mass with the dyestuff, for example by means of rollers or kneading devices.

Alternatively, the complex metal compound of logwood-extract may be produced in the mass to be colored. In this case it is advantageous to use solid extracts, for example the solid extract may be added to the solution of the mass together with the agent yielding metal, preferably while gently heating; or the solid mass may be treated with the solid extract and the agent yielding metal, also while gently heating, for example by means of rollers or kneading devices.

In both procedures there may be added a suitable substance, for example a fatty acid of high molecular weight, a filler, such as barium sulfate, zinc oxide or titanium oxide, or a softening agent or plasticizer, for example triphenylphosphate, tricresylphosphate, glycerine or castor oil.

The colored masses which may be covering, transparent, glazed or opaque, appear black, and these are very fast, particularly to light, and also are of strong color.

The following examples illustrate the invention, the parts being by weight:—

Example 1

3 parts of the chromium compound of a highly oxidized logwood-extract containing chiefly haematein ($C_{16}H_{12}O_6$) are ground in the course of 4 hours in a roller mill with 8 parts of tricresylphosphate and 2 parts of butylacetate. There are then added 90 parts of a commercial nitrocellulose lacquer and the grinding is continued until homogeneous dispersion has occurred. When applied to suitable surfaces (metal, glass, leather, wood, Celluloid, silk, cotton or the like), the paste thus obtained yields bluish-black coatings of excellent fastness to light.

The complex chromium compounds used in this example may be made as follows:—

50 parts of a highly oxidized logwood-extract are heated to boiling with 800 parts of water and to the solution there is added one of 15 parts of crystallized sodium bichromate in 50 parts of water. Boiling is continued for some hours in a reflux apparatus and 50 parts of common salt are added in order to bring into a form capable of being filtered the very fine chromium complex which has been precipitated. After drying and grinding there is obtained a blue-black powder, insoluble in water and in organic solvents.

Example 2

1 part of the chromium compound of a highly oxidized logwood-extract is mixed dry in the course of about 3 hours in a kneading apparatus with 50 parts of a molding powder made from a phenol-formaldehyde condensation product and the mass is then kneaded by mixing rollers at 100° C. After being cooled, it is pulverized and then molded in the usual manner. There are obtained oliveish black molded bodies.

Example 3

3 parts of the dyestuff used in Example 2 are made into a paste with 20 parts of oil varnish in the roller mill and, after about 4 hours, a further 80 parts of oil varnish are worked in and the operation of the rolling mill is continued until a homogeneous mass is produced. This mass yields on suitable supports deep black coatings of excellent fastness to light.

Example 4

3 parts of the chromium copper-compound of an oxidized logwood-extract are worked up with 100 parts of a lacquer from a phenol-formaldehyde condensation product in the manner indicated in Example 3. There is obtained a deep greyish-black.

The chromium-copper-compound used in this example may be made as follows:—

50 parts of a highly oxidized logwood-extract are heated to boiling in 1000 parts of water and then mixed with a solution of 12.5 parts of crystallized copper sulfate and 7.5 parts of crystallized sodium bichromate in 100 parts of water. After boiling for several hours the whole is filtered and the metal compound which is completely precipitated is washed and dried at a gentle temperature. After the grinding there is obtained a black powder, completely insoluble in water and in organic solvents.

Example 5

0.2 part of the iron-compound of a non-oxidized logwood-extract containing chiefly haematoxylin ($C_{16}H_{14}O_6$) is ground for 12 hours in a ball mill with 100 parts of a molding powder made from the urea-formaldehyde condensation product, and the mixture is then molded for 3 minutes at 145° C. There is obtained a grey molded object.

The iron compound used in this example may be made as follows:—

50 parts of a non-oxidized logwood-extract are heated to boiling with 800 parts of water, there are added 32.4 parts of ferric chloride, dissolved in 50 parts of water, and the whole is heated for some hours to boiling in a reflux apparatus. Filtration follows, and the iron compound which has been precipitated is washed and dried at a moderate temperature. When ground this product is a brown-black powder, insoluble in water and in organic solvents.

Example 6

5 parts of a nickel compound, which has been obtained by metallizing a mixture of 30 parts of logwood-extract and 10 parts of Persian berries by means of 28.1 parts of crystallized nickel sulfate, are ground for some hours in a roller mill with 15 parts of tricresylphosphate or another suitable softening agent and 5 parts of butylacetate. There are then added 50 parts of a commercial nitrocellulose lacquer and mixing is continued until a homogeneous mass is obtained. This paste is diluted with 450 parts of nitro-cellulose lacquer. On suitable supports there are obtained with this product brown-black coatings.

Example 7

10 parts of logwood-extract containing chiefly Haematoxylin are ground for 1 hour in the rollermill with 3 parts of copper-acetate. There are then added 15 parts of glycol-mono-methylether, 2.5 parts of glycollic acid-ethylester and 2.5 parts of tricresyl-phosphate, grinding being continued for 15–20 hours until a homogeneous dispersion is attained. The paste thus made is stirred or ground with 50 parts of a commercial nitrocellulose lacquer and then further diluted with 430 parts of the same lacquer. There is obtained a lacquer ready for a dipping or spraying operation which yields, on suitable supports, a bluish-black coating fast to light.

Example 8

5 parts of the chromium compound of a non-oxidized logwood-extract are ground in the course of 4 hours in a roller mill with 5 parts of tricresylphosphate and 15 parts of butyl acetate. There are then added 85 parts of a commercial nitrocellulose lacquer and grinding is continued until homogeneous dispersion has occurred. The paste thus obtained is further diluted to 200 parts with nitrocellulose lacquer. When applied to suitable surfaces there are obtained blue-black coatings of very good fastness to light.

The chromium compound used in this example may be made as follows:—

80 parts of a non-oxidized logwood-extract are heated to boiling in 1000 parts of water and then mixed with a solution of 16.7 parts of crystallized sodium bichromate and 14 parts of crystallized copper sulfate in 100 parts of water. Boiling is continued for one to two hours in a reflux apparatus whereupon the chromium copper complex which has separated is filtered and washed with much water until neutral and free of salts. After drying and grinding there is obtained a bluish black powder, insoluble in water and in organic solvents.

In the following table is given a series of complex metal compounds of logwood-extracts and the color tints which may be imparted to masses by these metal compounds.

| No. | Parent dyestuff | Metal | Color tint in nitrocellulose lacquer |
|---|---|---|---|
| 1 | Logwood-extract, highly oxidized | Cu | Greyish black. |
| 2 | ......do...... | Fe | Brownish black. |
| 3 | ......do...... | Ti | Violet black. |
| 4 | ......do...... | Co | Brown black. |
| 5 | ......do...... | Al | Violetish black. |
| 6 | ......do...... | Ni | Bluish black. |
| 7 | ......do...... | Wo | Violetish brown-black. |
| 8 | Logwood-extract, not oxidized | Cr | Bluish black. |
| 9 | ......do...... | Ni | Brownish black. |
| 10 | ......do...... | Vd | Grey black. |
| 11 | ......do...... | Cu | Greyish black. |
| 12 | ......do...... | Al | Violetish black. |

What we claim is:—

1. A fast colored composition of matter consisting of a nitrocellulosic plastic mass and a complex metal compound of a logwood-extract.

2. A fast colored composition of matter consisting of a plastic mass made from nitrocellulose and a complex chromium-copper compound of a logwood-extract.

FRITZ STRAUB.
HANS MAYER.